United States Patent
Shabi et al.

(10) Patent No.: US 11,403,233 B2
(45) Date of Patent: Aug. 2, 2022

(54) DETERMINING CAPACITY IN A GLOBAL DEDUPLICATION SYSTEM

(71) Applicant: EMC IP Holding Company LLC, Hopkinton, MA (US)

(72) Inventors: Uri Shabi, Tel Mond (IL); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 97 days.

(21) Appl. No.: 16/653,519

(22) Filed: Oct. 15, 2019

(65) Prior Publication Data

US 2021/0109869 A1 Apr. 15, 2021

(51) Int. Cl.
*G06F 12/126* (2016.01)
*G06F 12/1018* (2016.01)

(52) U.S. Cl.
CPC ........ *G06F 12/126* (2013.01); *G06F 12/1018* (2013.01); *G06F 2212/1044* (2013.01)

(58) Field of Classification Search
CPC .............. G06F 12/126; G06F 12/1018; G06F 2212/1044; G06F 3/0641
See application file for complete search history.

(56) References Cited

U.S. PATENT DOCUMENTS

| 10,331,350 | B1* | 6/2019 | Kucherov | G06F 3/0641 |
| 2010/0250896 | A1* | 9/2010 | Matze | G06F 3/0674 711/216 |
| 2017/0199895 | A1* | 7/2017 | Harnik | G06F 16/1752 |
| 2017/0235496 | A1* | 8/2017 | Brosch | G06F 16/1748 707/692 |
| 2018/0039422 | A1* | 2/2018 | Li | G06F 3/0608 |
| 2018/0364917 | A1* | 12/2018 | Ki | G06F 12/0246 |

OTHER PUBLICATIONS

U.S. Appl. No. 16/265,830, filed Feb. 1, 2019, Vankamamidi.

* cited by examiner

*Primary Examiner* — Michelle T Bechtold
(74) *Attorney, Agent, or Firm* — Daly, Crowley Mofford & Durkee, LLP (57) ABSTRACT

An aspect of determining per volume exclusive capacity in a deduplication system includes setting a percentage of a population of pages for selection. For each of the pages, an aspect includes selecting a page in the population, providing a data segment facilitating multiple references of the segment by at least one storage entity, maintaining counts corresponding with each segment in the page, and determining exclusive ownership of the page based on the counts and a key value of one of a plurality of storage entities.

16 Claims, 4 Drawing Sheets

DETERMINING CAPACITY IN A GLOBAL DEDUPLICATION SYSTEM

BACKGROUND

Data optimization techniques reduce system administration and storage overhead costs. One optimization technique is compression in which a system re-encodes data in a form that uses fewer bits than the original data, which can increase storage efficiency, transmission speed, and processing efficiency. Another optimization technique is deduplication in which a system eliminates duplicate data across a file system to increase storage efficiency, transmission speed, and processing efficiency. Data sent to a storage system can be segmented in fixed- or varying-sized segments in which each segment may be identified by an identifier, such as a hash signature or hash of data. Once the identifier is generated it is used to determine if the data segment already exists in the system. If it does, it does not need to be stored again. While data reduction techniques save on storage space, it can involve overhead costs such as increases in input/output (IO) access overhead.

Deduplication is a method for capacity reduction in modern storage system where multiple identical data segments, such as blocks, are represented by a single physical representation in the storage system. The benefits of deduplication increase as similar blocks appear frequently within the same object in storage.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method for determining per volume exclusive capacity in a deduplication system is provided. The method includes setting a percentage of a population of pages for selection. For each of the pages in the system, the method includes selecting a page in the population based on the set percentage. The method also includes providing a data segment in the system that facilitates multiple references of the data segment by at least one storage entity, and maintaining a plurality of counts in connection with each data segment in the page; and determining exclusive ownership of the selected page based on the plurality of counts and a key value of one of a plurality of storage entities.

A system for determining per volume exclusive capacity in a deduplication system is provided. The system includes a memory comprising computer-executable instructions, and a processor executing the computer-executable instructions. The computer-executable instructions when executed by the processor cause the processor to perform operations. The operations include setting a percentage of a population of pages for selection. For each of the pages in the system, the operations include selecting a page in the population based on the set percentage. The operations also include providing a data segment in the system that facilitates multiple references of the data segment by at least one storage entity. maintaining a plurality of counts in connection with each data segment in the page; and determining exclusive ownership of the selected page based on the plurality of counts and a key value of one of a plurality of storage entities.

A computer program product for determining per volume exclusive capacity in a deduplication system is provided. The computer program product is embodied on a non-transitory computer readable medium, the computer program product including instructions that, when executed by a computer, causes the computer to perform operations. The operations include setting a percentage of a population of pages for selection. For each of the pages in the system, the operations include selecting a page in the population based on the set percentage. The operations also include providing a data segment in the system that facilitates multiple references of the data segment by at least one storage entity; maintaining a plurality of counts in connection with each data segment in the page; and; determining exclusive ownership of the selected page based on the plurality of counts and a key value of one of a plurality of storage entities.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to real/write data, as well as issue requests for configuration of storage units in the storage system. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium. Also, a storage unit may refer to any unit of storage including those described above with respect to the storage devices, as well as including storage volumes, logical drives, containers, or any unit of storage exposed to a client or application. A storage volume may be a logical unit of storage that is independently identifiable and addressable by a storage system.

In certain embodiments, the term "IO request" or simply "IO" may be used to refer to an input or output request, such as a data read or data write request or a request to configure and/or update a storage unit feature. A feature may refer to any service configurable for the storage system.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, or similar data segments, where storage arrays can include, for example, dedicated storage hardware that contains spinning hard disk drives (HDDs), solid-state disk drives, and/or all-flash drives. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random IO data.

In certain embodiments, a data storage entity and/or storage unit may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines. In certain embodiments, a volume refers to a unit of storage on a disk.

In certain embodiments, a storage cluster may refer to a type of configuration that enables stretched clusters (e.g., clusters distributed across different geographic locations). Storage cluster configurations enable entities to provide load balancing and migrations between data centers.

In certain embodiments, Log Structured Storage (LSS) refers to a file system in which data and metadata are written sequentially to a circular buffer, called a log. Log-structured file systems reclaim free space from the tail of the log to prevent the file system from becoming hill when the head of the log wraps around to meet it. The tail can release space and move forward by skipping over data for which newer versions exist farther ahead in the log. If there are no newer versions, then the data is moved and appended to the head.

In certain embodiments, a block refers to a sequence of bytes or bits, having a maximum length (block size). The block size can be fixed or variable. A block device, or block storage device may refer to a level of abstraction for hardware that is responsible for storing and retrieving specified blocks of data. In certain embodiments, a file system may be based on a block device, which may be a level of abstraction for the hardware responsible for storing and retrieving specified blocks of data. Block storage may be abstracted by a file system or database management system (DBMS) for use by applications and end users. Physical or logical volumes accessed via block IO may be devices internal to a server, directly attached via SCSI or Fibre Channel, or remote devices accessed via storage area network (SAN) using protocols such as iSCSI. While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants are not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

As indicated above, deduplication is often used for providing capacity reduction in modern storage systems where multiple copies of data segments, such as blocks, are represented by a single physical representation in a storage system. To further reduce physical utilization, data segments from different objects (e.g., volumes, snapshots, virtual volumes (VVOL), etc.) can be jointly deduplicated, which involves deduplicating data segments from different storage objects. This process is referred to as global deduplication.

In a system that uses global deduplication, it is not trivial to determine the size or amount of the physical capacity that will be freed or reclaimed if the object is deleted (or migrated to a different storage system). This is due to the fact that deletion of logical space does not necessarily mean there will be even a single physical data segment that is unique and will be reclaimed. As a result, deletion of an object does not guarantee physical capacity reduction.

For example, assume a new data segment written to the system sourced from volume Vol1, and later due to deduplication, an additional 2 data segments of Vol1 are referenced to this data segment (throughout this time Vol1 should be referred to as the unique owner of the data segment, as deletion of the Vol1 reclaims capacity of this data segment). Assume also, that an additional deduplication sourced from volume Vol2 gets in to Vol1 and from this point Vol1 is no longer the unique owner as there are now two distinctive volumes sharing the same data segment. Later, if Vol1 copies are dereferences, the system needs to point to Vol2 as the owner of the data segment.

To overcome this problem, storage systems collect capacity reclamation information to determine the unique capacity occupied by each object that will be reclaimed (or freed) following its deletion.

Capacity reclamation determination methods may be divided between statistical estimation and exact (per data segment) calculation. Statistical estimations are less accurate but reduce the overhead required for exact calculations. An exact calculation is based on per data segment metadata to mark the ownership of each data segment. As a data segment may have multiple owners (logical space pointing to it) which may belong to single or multiple objects, the amount of data needed for exact representation is unpredictable and advanced encoding may be required. Further, an exact calculation requires that for every data segment written to the system, the unique capacity information is updated. This may considerably increase the storage system write-amplification, reduce system performance, and reduce the physical storage endurance.

Exact calculation results with a better estimation, but it comes with an expense which is the per data segment metadata used to predict the ownership, increased write-amplification, reduced performance, and reduced storage endurance.

The embodiments described herein combine the exact method with statistical (selective selection) to enable 'always available' capacity reclamation while maintaining very high accuracy without paying a large metadata overhead associated with the exact calculation.

Figure 1:
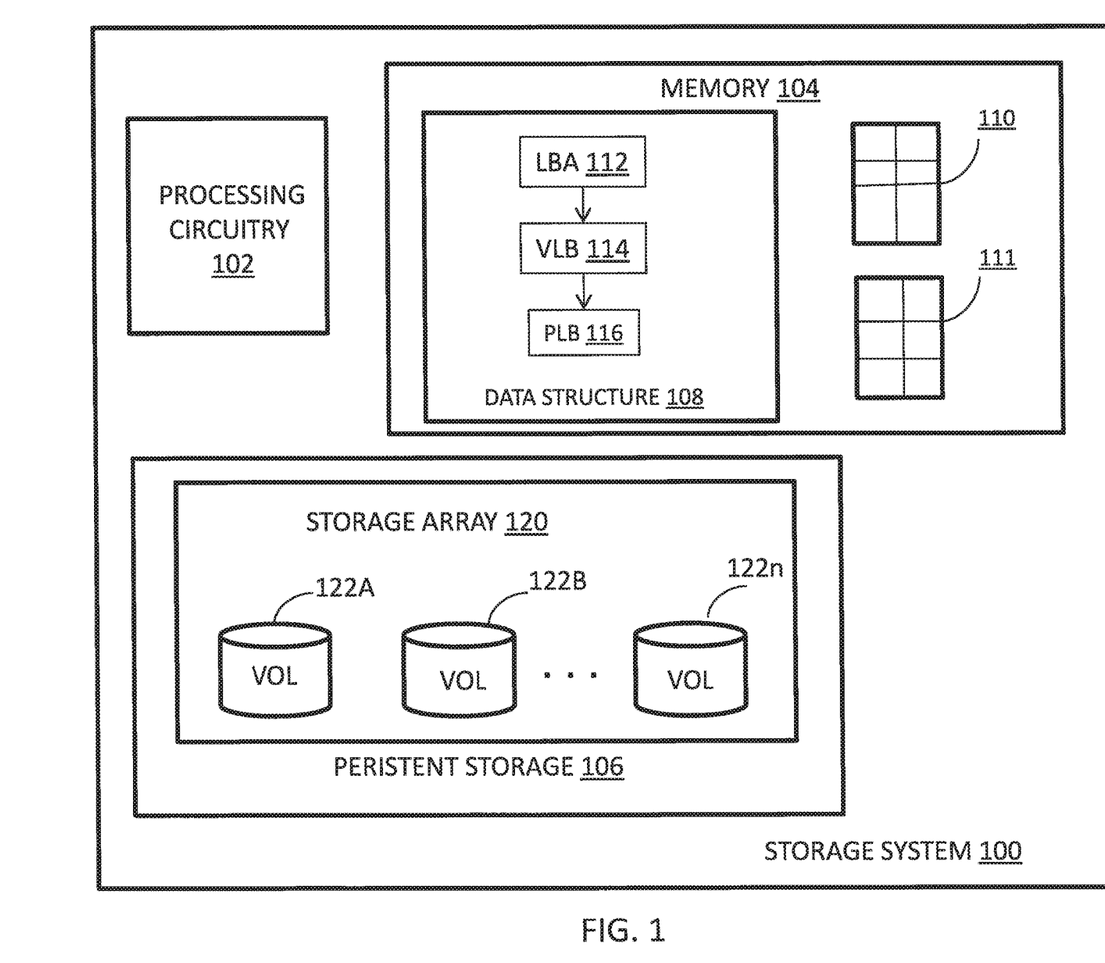
FIG. 1 is a diagram of an example of a storage system according to embodiments.

Turning now to FIG. 1, a system 100 for implementing determining capacity in a global deduplication system environment will now be described in accordance with embodiments. The storage system 100 of FIG. 1 includes processing circuitry 102, memory 104, and persistent storage 106. In an embodiment, the persistent storage 106 may be locally installed within the storage system 100, as shown in FIG. 1, or may be an external or remote device that is communicatively coupled to the storage system 100 via a connection (not shown).

If the persistent storage 106 is remote, it may be coupled to the storage system via known connections, interfaces and network circuitry, e.g., Ethernet cables, Wireless Fidelity (Wi-Fi) wireless connections, an IP network, SCSI cables, SATA cables, Fibre Channel (PC) cables, etc. If the connection is a network connection, then interfaces and network circuity may include, for example, one or more Ethernet cards, cellular modems, FC adapters, Wi-Fi wireless networking adapters, and/or other devices for connecting to a network. If the connection to the persistent storage is a local storage connection, then interface and/or network interface circuitry may include for example, SCSI, SAS, ATA, SATA, FC, and/or other similar controllers and ports.

The persistent storage 106 may include any kind of persistent storage devices, such as, for example, hard disk drives, solid-state storage devices, flash drives, etc. Persistent storage 106 stores user data as volumes 122A-122n, which represents one or more logical disks accessible by users. The volumes contain segments of data and the system 100 is operable to perform global deduplication of identical data segments identified among the volumes. Volumes 122A-122n are organized and managed with reference to metadata that is stored within various data structures, such as metadata structure 108 in memory 104. The metadata structure 108 is a multi-layered structure for handling metadata associated with the volumes 122a-122n. The multi-layered structure includes a top tier, a mid tier, and a low tier. In an embodiment, the tiers correspond to a logical layer, a virtual layer, and a physical layer. As shown in FIG. 1, a logical layer (LBA 112), a virtual layer (VLB 114), and a physical layer (PLB) 116 define the metadata structure 108. This structure 108 is further described in FIG. 2.

As shown in FIG. 1, by way of non-limiting example, the persistent storage is implemented via a storage array 120.

While the unit of data storage is described herein as volumes in a storage array, it is understood that other units of data storage or object storage may be employed to realize the advantages of the embodiments.

The memory 104 may be any kind of digital system memory, such as, for example, random access memory (RAM). Memory 104 stores an operating system (OS, not depicted) in operation (e.g., a Linux, UNIX, Windows, MacOS, or similar operating system). Memory 104 may also store an input/output (I/O) stack in operation (not shown). The I/O stack allows I/O requests (not depicted) from external hosts (as well as local applications) to be processed with respect to the volume data 122A-122n managed by the storage system 100.

The memory 104 also stores an index 110 for tracking metadata corresponding to data segments subject to compression. A hash table 111 is provided in the memory 104. The hash table 111 contains hashed values of data (e.g., stored as blocks) in the system. For each new unit of data (e.g., page or block), a lookup for a match is performed via the hash table.

The storage system includes processing circuitry 102, which may be any kind of processor or set of processors configured to perform operations, such as, for example, a microprocessor, a multi-core microprocessor, a digital signal processor, a system on a chip, a collection of electronic circuits, a similar kind of controller, or any combination of the above. It will be understood that the storage system 100 may also include other components as are well-known in the art, including interconnection circuitry. In operation, the processing circuitry 102 may execute one or more application, which may be implemented in logic executable by the processing circuitry.

The processing circuitry 102 is configured to receive and service input/output (IO) requests from one or more external or remote systems (not shown) that are communicatively coupled to the storage system 100. The coupling may be implemented via any type of communication network, such as Internet, local area network, wide area network, and may include wireline and/or wireless technology.

The volumes 122A-122n may be addressable via a logical address that is mapped to a physical address of the array through a three level of indirection scheme that is used to perform address translation during read and write operations with respect to the array.

In deduplication processes, levels of indirection with respect to storage addressing may be used to translate or map between layers of storage space: (i) low-level mappings (leaves) that contain pointers to data, (ii) mid-level mappings that contain pointers to the low-level mappings, and (iii) top-level mappings contain pointers to the mid-level mappings. The low level can be logical block address space (LBA), the mid level can be virtual block address space (VLB), and the top level can be physical address space (PLB). Each of these address spaces reflect a range of addresses. The mapping can be implemented using a data structure that takes a logical address and uses a pointer to point to a VLB address, which in turn points to a physical address (PLB) in which certain data (e.g., such as a page) resides.

Figure 2:
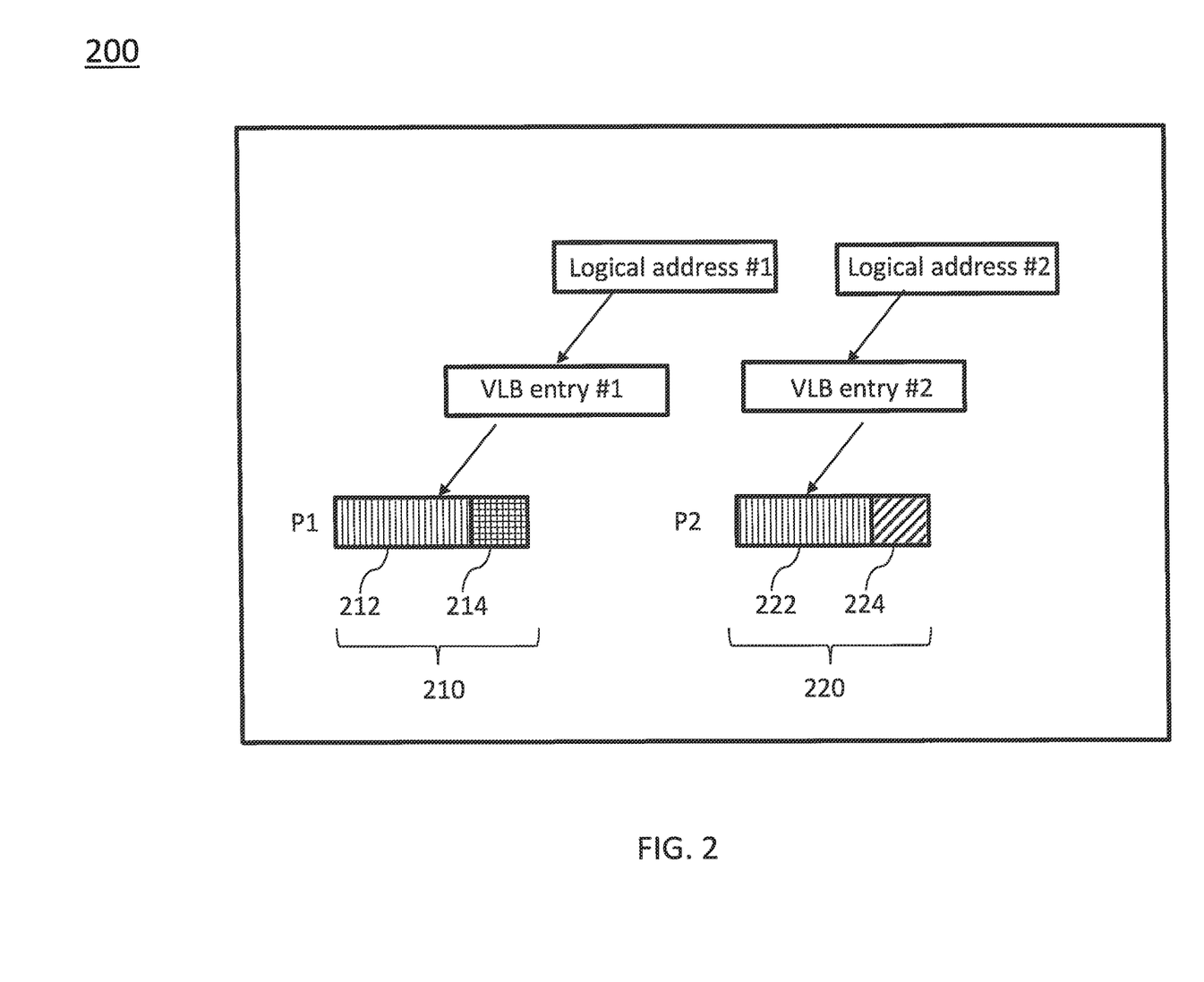
FIG. 2 is a diagram depicting an example metadata data structure.

As shown in FIG. 2, a metadata data structure, which may be implemented in a Log Structured Storage (LSS) system, includes a three-level indirection scheme to access user data. The three-level scheme includes a logical block address (LE) level leaf level), a virtual block (VLB) level, and a physical block (PLB) level. The leaf is a logical block address (LBA) representation layer that is generally organized as a tree where each leaf corresponds to a specific LEA range. In log-structured storage systems, the data is stored in contiguous chunks of data, which is referred to as PLB (e.g., 2 MB chunks). The actual user data pages reside inside the and are referenced by the VLB.

Reduplication may be implemented using a unique hash representing a page. The system may include a deduplication index that represents most hashes (which in turn represent most unique capacity of the cluster of volumes. A partial page match occurs when a subpage (e.g., few sectors of the page) match as between two pages (e.g., part of the page are unique and part of the pages are in common).

A logical representation of metadata in a data structure 200 for two partial matching pages (P1 and P2, 210 and 220, respectively) in a cluster for which full page deduplication is performed is shown in FIG. 2. As shown in FIG. 2, the two pages P1 and P2 are maintained separately of one another (i.e., no common part of the pages are maintained by the system). The common part of the pages (i.e., represent duplicate data) are shown as 212 and 222. The page P1 also contains data 214 which is not in common with P2. Likewise, the page P2 contains data 224 that is not in common with page P1. Thus, the data stored in part of the page P1 (214) is not a duplicate of the part of the data stored in P2 (224). In the metadata structure 200 of FIG. 2, for page P1 (210), a logical address #1 for the page points to a VLB entry #1, which in turns points to the page P1. Also in the metadata structure 200 of FIG. 2, for page P2 (220), a logical address #2 for the page points to a VLB entry #2, which in turn points to the page P2.

Embodiments described herein combine the exact method with statistical (selective selection) to enable 'always available' capacity reclamation while maintaining very high accuracy without paying a large metadata overhead associated with the exact calculation.

Exact unique capacity methods calculate on a page basis the unique page owner. By using a good page-selection-method only a small population is selected out of all the pages in the cluster which can dramatically reduce the amount of metadata that would need to be stored while the other properties of exact calculation (accuracy, always available).

The quality of the techniques described herein is based on the quality of the selection method. One such method is using a hash representing the user page. For computational optimization purposes the embodiments provide for the use of the same hash function that is used for the deduplication algorithm employed by the storage system. The deduplication hash functions, by design, have the property of having a perfect distribution over the population.

By using a good selection method and setting the percent of selected pages used for the estimation, it is possible to control the balance between amount of metadata (per selected page) as well as the accuracy (e.g., increases as selected population increase). For example, selecting 1 out of 100 pages can reduce the overhead costs by two orders of magnitude, and simulation shows that can provide an estimation of better than 0.2% of the unique object capacity.

As an example, a SHA-1 is selected as the hash, and a population which is 1:64 of the total population is used. In this scenario, a page may be selected for which its hash's 6 least significant bits equal 0.

Once the number of pages used for unique capacity determination is reduced, the same calculation can continue to be performed to determine the uniqueness of the data segments. In an embodiment, a 2sum method may be used to update, maintain, and determine the uniqueness and owners of a data segment. The 2sum method is described in commonly assigned U.S. patent application Ser. No. 16/265, 830, entitled "Method, Apparatus, and Computer Program Product for Determining Ownership of a Data Segment," filed on Feb. 1, 2019, the contents of which are incorporated herein in their entirety.

The 2sum is saved and updated as part of writing VLB (indirection page between the logical address and physical address of the data segments which also maintain the reference count used for deduping purposes).

Figure 3:
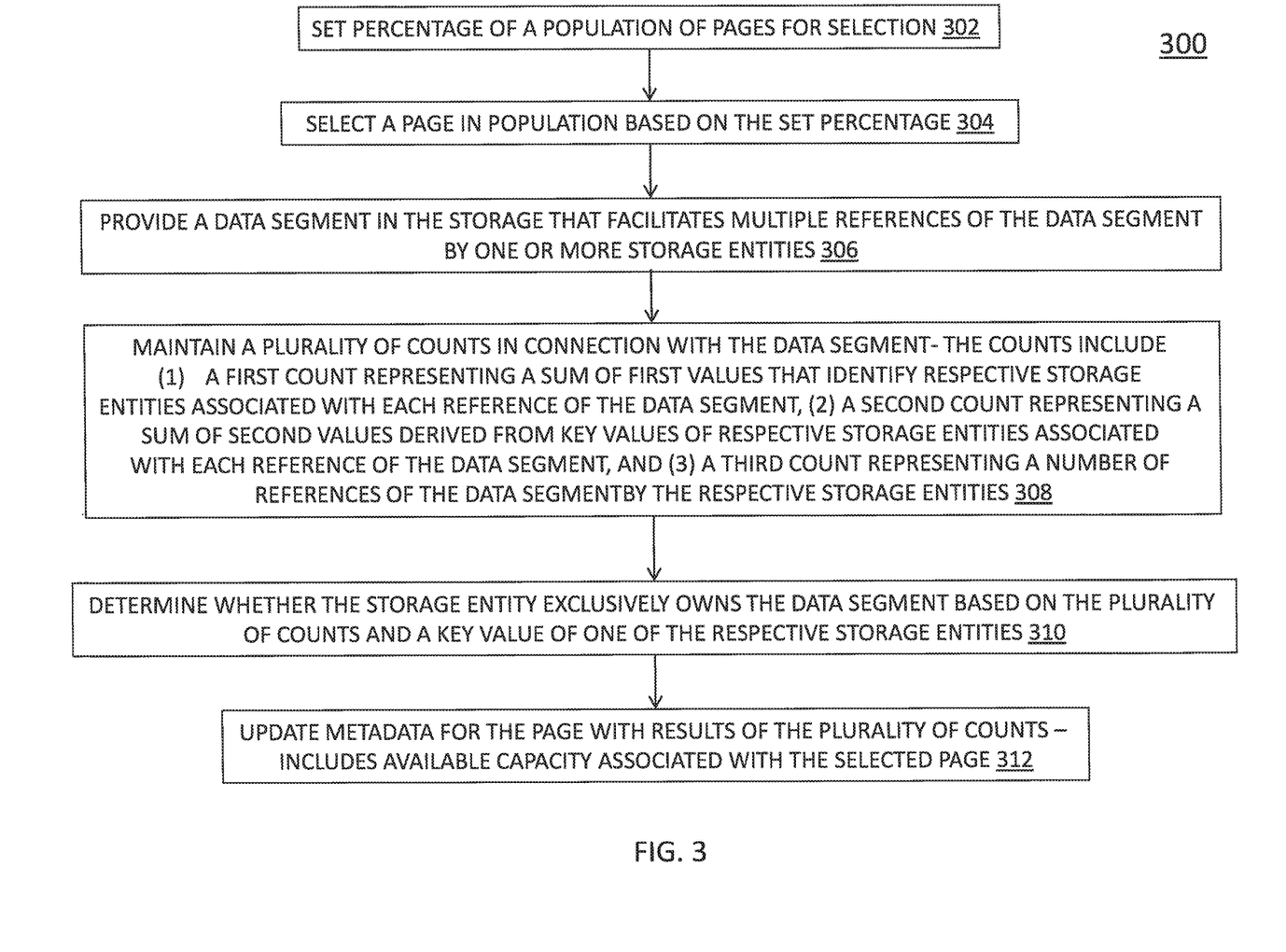
FIG. 3 is a flowchart of a process according to embodiments.

Turning now to FIG. 3, a process 300 for determining unique capacity in a deduplication system will now be described. In block 302, the process 300 sets a percentage of a population of pages for selection. The actual percentage chosen may reflect a balance between higher accuracy of the process versus the amount of required resources. In embodiments, a method to select pages should be deterministic and un-biased to reduce error. A simple page selection method may reuse full page hash calculation and a selection of pages based on the hash value, e.g., for ~3% selection, selection method of five least significant bits (e.g., 5 bits) is equal to 0—>selection of 1 out of 32 pages.

In block 304, the process 300 selects a page according to the percentage determination described above. For example, if one out of 32 pages is determined for selection, this represents approximately 3% of the total pages.

The processes described in blocks 306-310 below may be implemented via, e.g., the 2sum method referenced above in U.S. patent application Ser. No. 16/265,830. In block 306, a data segment in a storage device is provided that facilitates multiple references of the data segment by one or more storage entities.

In block 308, a plurality of counts is maintained in connection with the data segment, where the plurality of counts comprise (i) a first count representing a sum of first values that identify the respective storage entities associated with each reference of the data segment, (ii) a second count representing a sum of second values that derive from key values of the respective storage entities associated with each reference of the data segment, and (iii) a third count representing a number of references of the data segment by the respective storage entities.

In block 310, based on the plurality of counts and a key value of one of the respective storage entities, the process 300 determines whether the storage entity exclusively owns the data segment.

In block 312, the process 300 updates metadata for the page with results of the plurality of counts. The metadata includes exclusive capacity (if any) associated with the selected page.

Based on calculating the object unique capacity, the following may be performed:
  Calculate the hash of the page, if hash is determined to be outside of selective population
    Total-Capacity: maintain a total capacity indication (for selected and non-selected pages)
  Update per page exclusivity by using the 2sum method disclosed above in application Ser. No. 16/265,830.
  Save the 2sum in the VLB specific fields.
  Update the capacity information using the following formulas:
    Total-Capacity: maintain a total capacity indication (for selected and non-selected pages)
    Total-Capacity-For-Selected-Pages: maintain a total capacity indication only for the selected pages in the system Volume-unique-capacity: maintain the total volume unique capacity (per volume)

Selection ratio=total-capacity/Total-Capacity-For-Selected-Pages: represent the ratio between total capacity in the system and selected capacity by our selection-method To calculate a volume or volume-family: volume-reclaimable-capacity=volume-unique capacity*selection-ratio By using selective factor of about 1/100, the VLB overhead and possibly write amplification is reduced by factor of 100. The page is selected or not on its first appearance in the system. Once selected, its unique owner is handled per each inc-ref or dec-ref until its dereferenced (i.e., completely removed from the system).

As unique capacity changes on inc-ref and dec-ref operations, the process maintaining selection-based-exact-calculation on a per volume basis becomes a negligible portion of the system.

Capacity may be monitored as logical or physical in the following manner:

Logical capacity:
Each data segment is considered uncompressed (e.g., 4 KB in size)
Total-capacity, Total-Capacity-For-Selected-Pages and per volume are counted in pages
Logical capacity is multiplied by page size (e.g., 4K)
Physical capacity:
For each data segment the actual compressed size residing on disk is considered
Total-capacity, Total-Capacity-For-Selected-Pages, and per volume are counted in bytes
Physical capacity In the process of FIG. 3, an example of the extrapolation of converting the selected capacity to actual capacity will now be described. The example assumes a 4 KB page system:

Total-capacity=1e9 pages
Total-Capacity-For-Selected-Pages=29e6 pages
2 volumes in the system
Vol-1 selected size=12e6 pages
Vol-2 selected size=15e6 pages
Selection ratio=Total-capacity/Total-Capacity-For-Selected-Pages=34.48
Vol-1 unique capacity=Vol-1 selected size*selection-ration=12e6*34.48=413e6 pages=1578 TB
Vol-2 unique capacity=Vol-2 selected size*selection-ration=15e6*34.48=517e6 pages=1973 TB
Common capacity=(29e6-12e6-15e6)*34.48=8e6 pages 7 TB In the above example, there are two volumes V1 and V2 and a selected size for V1 is 12e6 pages and a selected size for V2 is 15e6 pages. The selection ratio is determined by dividing the total capacity by the total capacity for the selected pages. In this example, 34.48 is the selection ratio. For each volume V1 and V2, the unique capacity is determined by multiplying the volume's selected size by the selection ratio.

Figure 4:
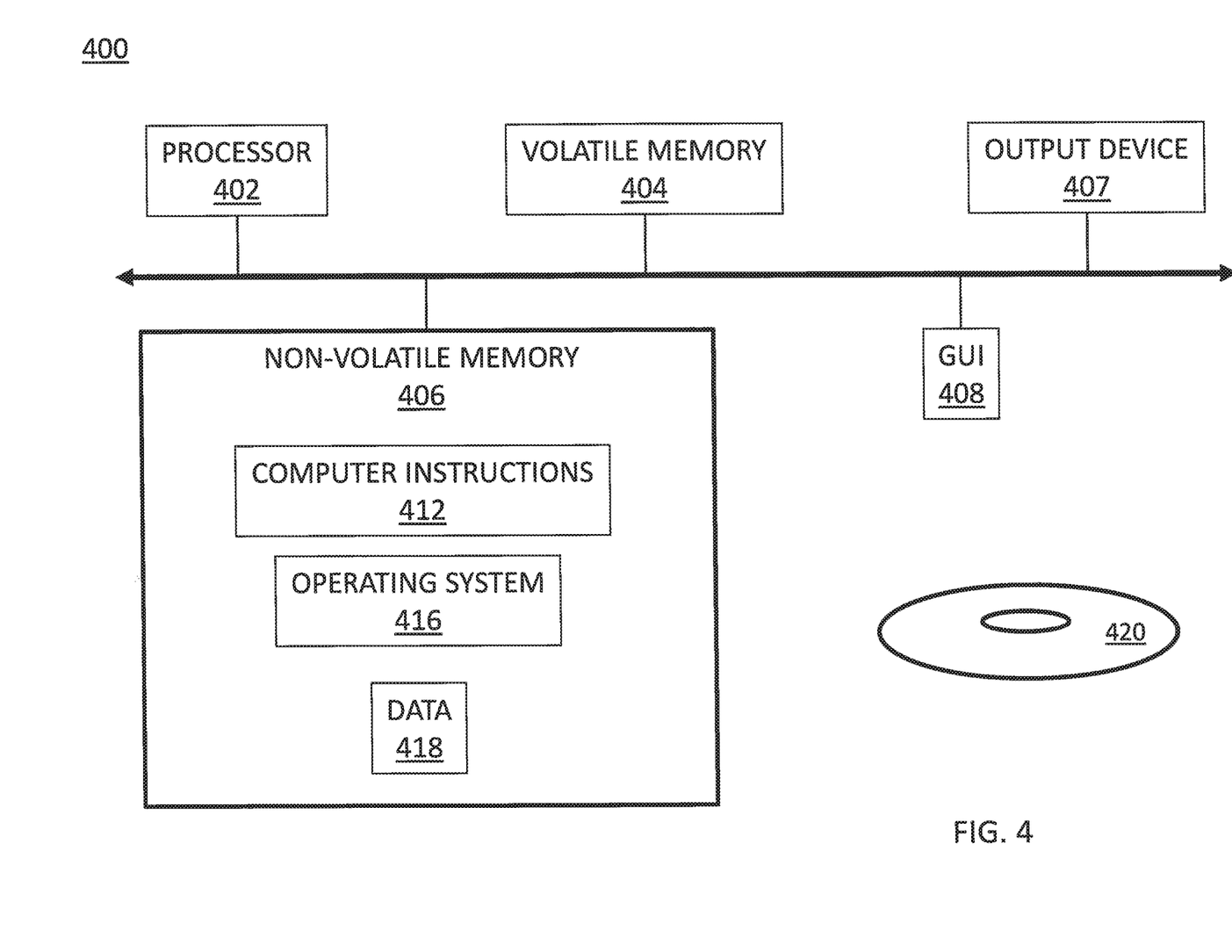
FIG. 4 is a diagram of an example of a computing device according to embodiments.

FIG. 4 shows an exemplary computer 400 (e.g., physical or virtual) that can perform at least part of the processing described herein. The computer 400 includes a processor 402, a volatile memory 404, a non-volatile memory 406 (e.g., hard disk or flash), an output device 407 and a graphical user interface (GUI) 408 (e.g., a mouse, a keyboard, a display, for example). The non-volatile memory 406 stores computer instructions 412, an operating system 416 and data 418. In one example, the computer instructions 412 are executed by the processor 402 out of volatile memory 404. In one embodiment, an article 420 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to the disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, Which are described in the context of a single embodiment, may also be provided separately or in any suitable subcombination. Other embodiments not specifically described herein are also within the scope of the following claims.

The invention claimed is:

1. A method for determining per volume exclusive capacity in a deduplication system, the method comprising:
    (a) setting a percentage of a population of pages for selection;
    (b) selecting a page in the population based on the set percentage;

(c) providing a data segment in the system that facilitates multiple references of the data segment by at least one storage entity;

(d) maintaining a plurality of counts in connection with the data segment in the selected page, the plurality of counts including a first count representing a sum of first values that identify respective storage entities associated with each reference of the data segment;

(e) determining exclusive ownership of the selected page based on the plurality of counts and a key value of one of a plurality of storage entities; and (f) updating metadata for the selected page with results of the plurality of counts, the metadata including available capacity associated with the selected page, wherein updating the metadata for the selected page includes storing the results in a virtual block storage address space corresponding with the selected page, wherein steps (b)-(f) are repeated until the set percentage is reached.

2. The method of claim 1, wherein selecting a page in the population based on the percentage includes selecting a page with a hash value in which a number of the hash's least significant bits equal zero.

3. The method of claim 1, wherein the plurality of counts further includes: a second count representing a sum of second values derived from key values of the respective storage entities associated with each reference of the data segment, and a third count representing a number of references of the data segment by the respective storage entities.

4. The method of claim 1, wherein the virtual block storage address space references a virtual logical block, the virtual logical block indicating an indirection page between a logical address and a physical address of blocks corresponding to the selected page.

5. The method of claim 1, further comprising detecting a total amount of capacity for the selected pages in the population.

6. The method of claim 1, further comprising performing a statistical estimation calculation for capacity of the global deduplication system using pages in the population not selected.

7. A system for determining per volume exclusive capacity in a deduplication system, the system comprising:

a memory comprising computer-executable instructions; and a processor executing the computer-executable instructions, the computer-executable instructions when executed by the processor cause the processor to perform operations comprising:

(a) setting a percentage of a population of pages for selection;

(b) selecting a page in the population based on the set percentage;

(c) providing a data segment in the system that facilitates multiple references of the data segment by at least one storage entity;

(d) maintaining a plurality of counts in connection with the data segment in the selected page, the plurality of counts including a first count representing a sum of first values that identify respective storage entities associated with each reference of the data segment;

(e) determining exclusive ownership of the selected page based on the plurality of counts and a key value of one of a plurality of storage entities; and (f) updating metadata for the selected page with results of the plurality of counts, the metadata including available capacity associated with the selected page, wherein updating the metadata for the selected page includes storing the results in a virtual block storage address space corresponding with the selected page, wherein steps (b)-(f) are repeated until the set percentage is reached.

8. The system of claim 7, wherein selecting a page in the population based on the percentage includes selecting a page with a hash value in which a number of the hash's least significant bits equal zero.

9. The system of claim 7, wherein the plurality of counts further includes: a second count representing a sum of second values derived from key values of the respective storage entities associated with each reference of the data segment, and a third count representing a number of references of the data segment by the respective storage entities.

10. The system of claim 7, wherein the virtual block storage address space references a virtual logical block, the virtual logical block indicating an indirection page between a logical address and a physical address of blocks corresponding to the selected page.

11. The system of claim 7, wherein the operations further include detecting a total amount of capacity for the selected pages in the population.

12. A computer program product for determining per volume exclusive capacity in a deduplication system, the computer program product embodied on a non-transitory computer readable medium, and the computer program product including instructions that, when executed by a computer, causes the computer to perform operations, the operations including:

(a) setting a percentage of a population of pages for selection;

(b) selecting a page in the population based on the set percentage;

(c) providing a data segment in the system that facilitates multiple references of the data segment by at least one storage entity;

(d) maintaining a plurality of counts in connection with the data segment in the selected page, the plurality of counts including a first count representing a sum of first values that identify respective storage entities associated with each reference of the data segment;

(e) determining exclusive ownership of the selected page based on the plurality of counts and a key value of one of a plurality of storage entities; and (f) updating metadata for the selected page with results of the plurality of counts, the metadata including available capacity associated with the selected page, wherein updating the metadata for the selected page includes storing the results in a virtual block storage address space corresponding with the selected page, wherein steps (b)-(f) are repeated until the set percentage is reached.

13. The computer program product of claim 12, wherein selecting a page in the population based on the percentage includes selecting a page with a hash value in which a number of the hash's least significant bits equal zero.

14. The computer program product of claim 12, wherein the plurality of counts include: a first count representing a sum of first values that identify respective storage entities associated with each reference of the data segment, a second count representing a sum of second values derived from key values of the respective storage entities associated with each reference of the data segment, and a third count representing a number of references of the data segment by the respective storage entities.

15. The computer program product of claim 12, wherein the virtual block storage address space references a virtual logical block, the virtual logical block indicating an indirection page between a logical address and a physical address of blocks corresponding to the selected page.

16. The computer program product of claim 12, wherein the operations further include detecting a total amount of capacity for the selected pages in the population.

* * * * *